United States Patent
Zhang et al.

(10) Patent No.: US 11,880,669 B2
(45) Date of Patent: Jan. 23, 2024

(54) REDUCING COMPILER TYPE CHECK COSTS THROUGH THREAD SPECULATION AND HARDWARE TRANSACTIONAL MEMORY

(71) Applicant: Intel Corporation, Santa Clara, CA (US)

(72) Inventors: Shiyu Zhang, Shanghai (CN); Junyong Ding, Shanghai (CN); Tianyou Li, Shanghai (CN); Mohammad R. Haghighat, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/639,809

(22) PCT Filed: Oct. 8, 2019

(86) PCT No.: PCT/CN2019/109904
§ 371 (c)(1),
(2) Date: Mar. 2, 2022

(87) PCT Pub. No.: WO2021/068102
PCT Pub. Date: Apr. 15, 2021

(65) Prior Publication Data
US 2022/0326921 A1 Oct. 13, 2022

(51) Int. Cl.
G06F 8/41 (2018.01)
G06F 9/455 (2018.01)

(52) U.S. Cl.
CPC ............. *G06F 8/443* (2013.01); *G06F 8/437* (2013.01); *G06F 8/458* (2013.01); *G06F 9/4552* (2013.01)

(58) Field of Classification Search
None
See application file for complete search history.

(56) References Cited

U.S. PATENT DOCUMENTS

| | | | |
|---|---|---|---|
| 5,179,702 A * | 1/1993 | Spix | G06F 9/3838 717/124 |
| 8,387,027 B2 | 2/2013 | Buckley et al. | |
| 10,061,568 B2 | 8/2018 | Gao et al. | |

(Continued)

FOREIGN PATENT DOCUMENTS

| | | |
|---|---|---|
| CN | 101441569 A | 5/2009 |
| CN | 104081361 4 | 10/2014 |

(Continued)

OTHER PUBLICATIONS

International Search Report and Written Opinion for PCT Patent Application No. PCT/CN2019/109904 dated Jul. 20, 2020, 10 Pages.

(Continued)

*Primary Examiner* — Qing Chen
(74) *Attorney, Agent, or Firm* — Jordan IP Law, LLC

(57) ABSTRACT

Systems, apparatuses and methods may provide for technology that generates a first compiler output based on input code that includes dynamically typed variable information and generates a second compiler output based on the input code, wherein the second compiler output includes type check code to verify one or more type inferences associated with the first compiler output. The technology may also execute the first compiler output and the second compiler output in parallel via different threads.

20 Claims, 8 Drawing Sheets

(56) References Cited

U.S. PATENT DOCUMENTS

| | | | | |
|---|---|---|---|---|
| 2005/0198627 A1* | 9/2005 | Du | ............ | G06F 8/452 |
| | | | | 717/160 |
| 2008/0235675 A1* | 9/2008 | Chen | ........ | G06F 8/437 |
| | | | | 717/147 |
| 2013/0067441 A1* | 3/2013 | Lafreniere | ......... | G06F 8/41 |
| | | | | 717/146 |
| 2013/0205286 A1 | 8/2013 | Barraclough et al. | | |
| 2014/0282441 A1* | 9/2014 | Hoban | ........... | G06F 8/437 |
| | | | | 717/141 |
| 2015/0058830 A1* | 2/2015 | Verlaguet | ......... | G06F 9/3846 |
| | | | | 717/136 |
| 2015/0067658 A1 | 3/2015 | Hahnenberg | | |
| 2015/0220338 A1 | 8/2015 | Zhu | | |
| 2018/0173506 A1* | 6/2018 | Hodaei | .......... | G06F 8/41 |

FOREIGN PATENT DOCUMENTS

| | | |
|---|---|---|
| CN | 105493041 A | 4/2016 |
| CN | 108920149 A | 11/2018 |

OTHER PUBLICATIONS

Süßkraut, M. et al., "Speculation for Parallelizing Runtime Checks." Stabilization, Safety, and Security of Distributed Systems. Springer, Berlin, Heidelberg. XP019133357, Nov. 3, 2009, pp. 698-710.
Extended European Search Report for Application No. EP 19948627.5 dated May 23, 2023, 11 pages.

* cited by examiner

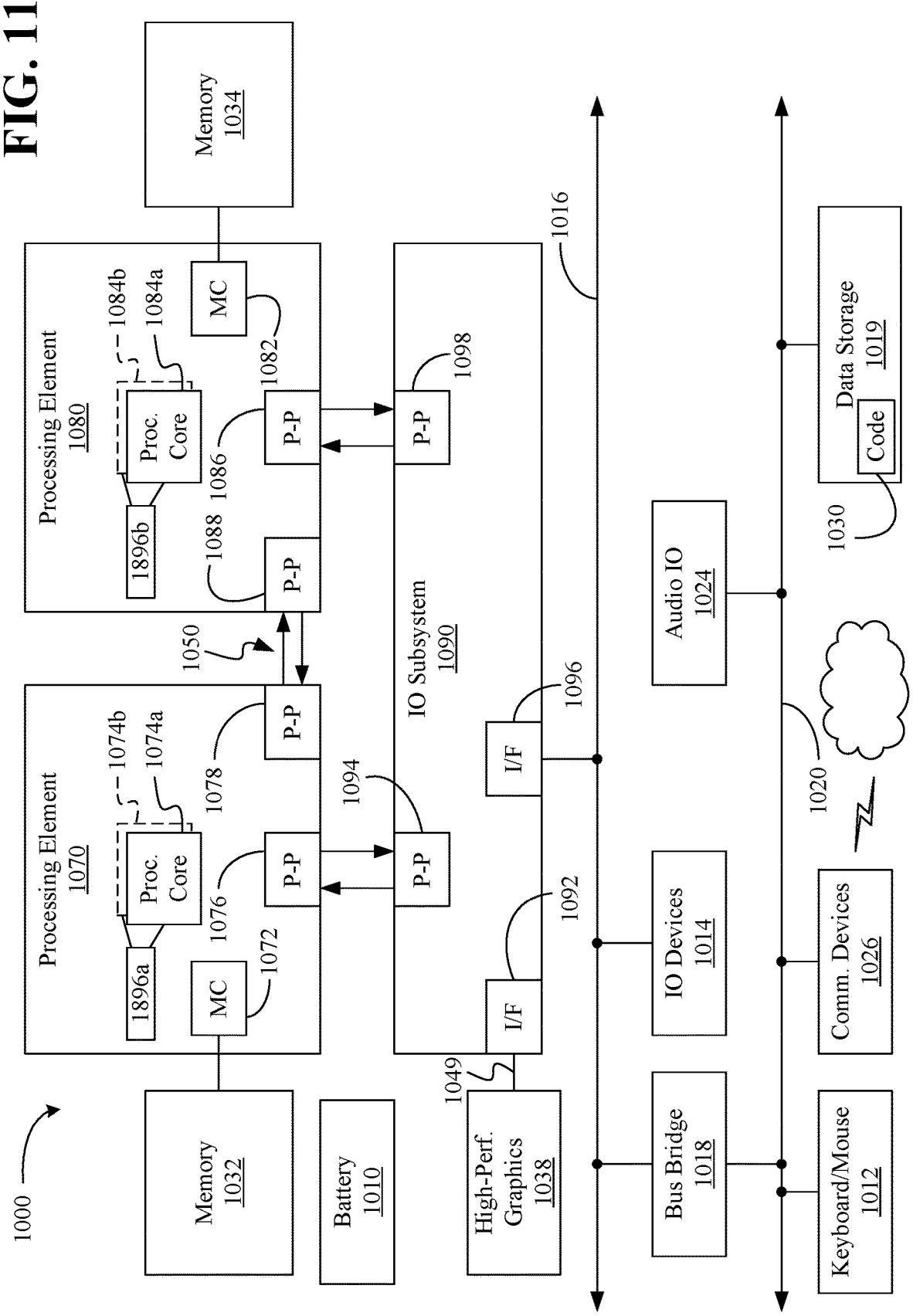

REDUCING COMPILER TYPE CHECK COSTS THROUGH THREAD SPECULATION AND HARDWARE TRANSACTIONAL MEMORY

CROSS REFERENCE TO RELATED APPLICATIONS

The present application is a U.S. National Phase Patent Application, which claims the benefit of priority to International Patent Application No. PCT/CN2019/109904 filed on Oct. 8, 2019.

TECHNICAL FIELD

Embodiments generally relate to compiler technology. More particularly, embodiments relate to reducing compiler type check costs through thread speculation and hardware transactional memory.

BACKGROUND

Computer programming languages provide for the use of variables to retrieve data, perform operations, output data, and so forth. During compilation of an application written in a given programming language, the types of variables being used in the application may impact certain code optimization decisions made by the compiler. Applications written in dynamically typed languages such as JAVASCRIPT, PYTHON and RUBY typically have variable type information that is known only at runtime (e.g., and not at compile time). The lack of variable type information at compile time may result in the application executing much more slowly than applications written in statically typed languages. For example, conventional solutions might compile dynamically typed application into a generic code path that is structured to deal with strings, floating point numbers, double precision numbers and all other variable types when a code path optimized for integer addition might be more efficient (e.g., but the integer type information is not known at compile time).

While just-in-time (JIT) compilation techniques may be combined with type inferences and/or speculation to increase execution speed, there remains considerable room for improvement. For example, current approaches to implementing type check code (e.g., to verify type inferences made during compilation) may introduce processing overhead that counteracts the benefits of JIT compilation and type inferences/speculation.

BRIEF DESCRIPTION OF THE DRAWINGS

The various advantages of the embodiments will become apparent to one skilled in the art by reading the following specification and appended claims, and by referencing the following drawings, in which:

FIG. 11 is a block diagram of an example of a multi-processor based computing system according to an embodiment.

DESCRIPTION OF EMBODIMENTS

Figure 1:
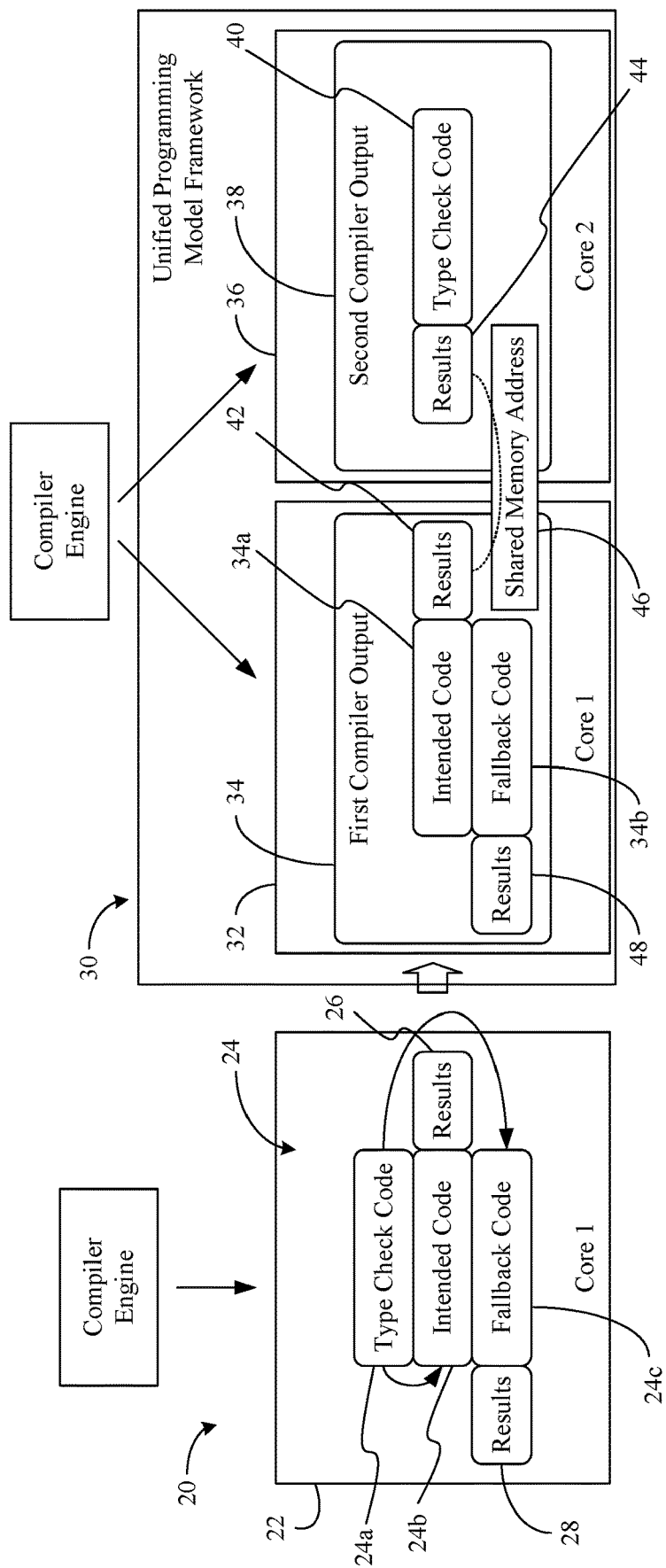
FIG. 1 is a comparative block diagram of an example of a conventional compiler execution architecture and a compiler execution architecture according to an embodiment.

Turning now to FIG. 1, a conventional execution architecture 20 is shown in which a processor core 22 ("Core 1") executes a compiler output 24 (24a-24c) that includes type check code 24a, "intended" code 24b (e.g., including payload code to retrieve data, perform operations, output data, etc.), and fallback code 24c. In the illustrated example, the type check code 24a verifies one or more type inferences made by the compiler (not shown) to optimize the intended code 24b, which generates results 26 when executed. If the illustrated type check code 24a determines that at least one of the type inference(s) was incorrect, the type check code 24a may trigger the execution of the fallback code 24c, which generates results 28 without reliance on the incorrect type inference(s).

Of particular note is that the illustrated type check code 24a, the intended code 24b and the fallback code 24c are executed sequentially on the same processor core 22 (e.g., in the same thread and/or task). As a result, the conventional execution architecture 20 may execute the compiler output 24 relatively slowly, particularly when the type check code 24a has a relatively high processing overhead (e.g., due to a large number of branches). Indeed, the overhead/costs associated with the type check code 24a may often be unnecessary if the type inference(s) are often correct. Additionally, the compiler output 24 may consume a relatively high amount of cache space (e.g., level one/L1 instruction cache/I-cache) due to the type check code 24a being included in the same instruction execution stream as the intended code 24b.

By contrast, an enhanced execution architecture 30 may include a first processor core 32 ("Core 1") that executes a first compiler output 34 (34a-34b, e.g., in a first thread) and a second processor core 36 that executes a second compiler output 38 (e.g., in a second thread) in parallel with the first compiler output 34. In an embodiment, the first compiler output 34 includes intended code 34a and fallback code 34b, whereas the second compiler output 38 includes type check code 40. Thus, the type check code 40 may verify one or more inferences made by the compiler apparatus to optimize the intended code 34a, while the intended code 34a generates results 42. In the illustrated example, the intended code 34a also generates results 44 that are synchronized with the results 42 of the intended code 34a via a shared memory address 46. If the results 44 of the illustrated type check code 40 indicate that at least one of the type inference(s) was incorrect, the intended code 34a may trigger the execution of the fallback code 34b, which generates results 48 without reliance on the incorrect type inference(s). Thus, the fallback code 34b may transition the architecture 30 into an execution state that is independent of the type inference(s) if the verification of the type inference(s) fails.

Indeed, the different threads may be dispatched to different hardware computation units in a heterogeneous system via a unified programming model such as, for example ONEAPI. More particularly, the unified programming model might be used to program a broad range of processor types including CPU (central processing unit), GPU (graphics processing unit), FGPA (field programmable gate array), and special-purpose accelerators. For example, the unified programming model may be used to dedicate the second compiler output 38 to a small CPU core as it is usually short and contains no computation work. By contrast, the unified programming model might be used to dedicate the first compiler output 34 to 1) a relatively large CPU core if it contains heavy scalar computation, 2) a GPU if it contains heavy vector computation, 3) an artificial intelligence (AI) accelerator (e.g., INTEL MOVIDIUS accelerator) if it contains heavy matrix computation or 4) an FPGA if it contains heavy spatial computation.

The enhanced execution architecture 30 therefore enables enhanced performance to be achieved by executing the first compiler output 34 and the second compiler output 38 in parallel via different threads. More particularly, the illustrated intended code 34a is not forced to wait until operation of the type check code 40 (e.g., which might contain a large number of branches) is complete as in the conventional execution architecture 20. Rather, the intended code 34a may speculatively execute in a separate thread so that the results 42 are generated more quickly and while the type check code 40 is executing. Indeed, experiments and investigations have shown around significant performance improvements for the dynamically typed V8 JAVASCRIPT engine without any hardware changes being made. The enhanced performance may translate into better responsiveness and/or smoothness of applications (e.g., web applications, NODEJS applications) and an improved user experience. Moreover, systems having relatively small I-caches may achieve locality and performance levels that are on par with systems having relatively large I-cache sizes due to the isolation of the type check code 40 in a separate thread.

Figure 2:
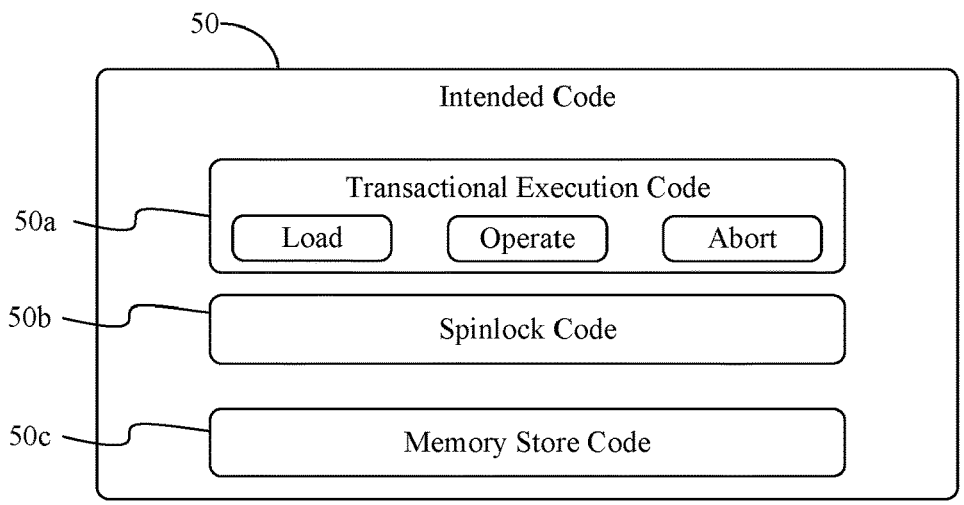
FIG. 2 is a block diagram of an example of intended code according to an embodiment.

FIG. 2 shows an example of intended code 50 (50a-50c) that may be readily substituted for the intended code 34a (FIG. 1). In the illustrated example, the intended code 50 includes transactional execution code 50a with snippets to load data from memory and operate on the loaded data, spinlock code 50b to place the first compiler output in a wait state until verification of the type inference(s) is confirmed by the second compiler output, and memory store code 50c to store one or more results of the transactional execution code 50a to the memory. The transactional execution code 50a may also include code to abort the tasks (e.g., loading, operation) of the intended code 50 if the verification of the type inference(s) fails.

In this regard, restricted transactional memory (RTM) may provide a software interface for transactional execution. In an embodiment, RTM provides three instructions—XBEGIN, XEND, and XABORT—to start, commit, and abort transactional execution, respectively. The XBEGIN instruction may be used to specify the start of the transactional code region and the XEND instruction may be used to specify the end of the transactional code region. A processor may abort RTM transactional execution for many reasons (e.g., type check failure). In such a case, the hardware automatically detects transactional abort conditions, restarts execution from the fallback instruction address with the architectural state corresponding to the state at the start of the)(BEGIN instruction and updates an EAX register to describe the abort status. The XABORT instruction therefore enables the execution of an RTM region to be aborted explicitly. In an embodiment, the)(ABORT instruction takes an 8-bit immediate argument that is loaded into the EAX register, which becomes available to software following an RTM abort.

Figure 3:
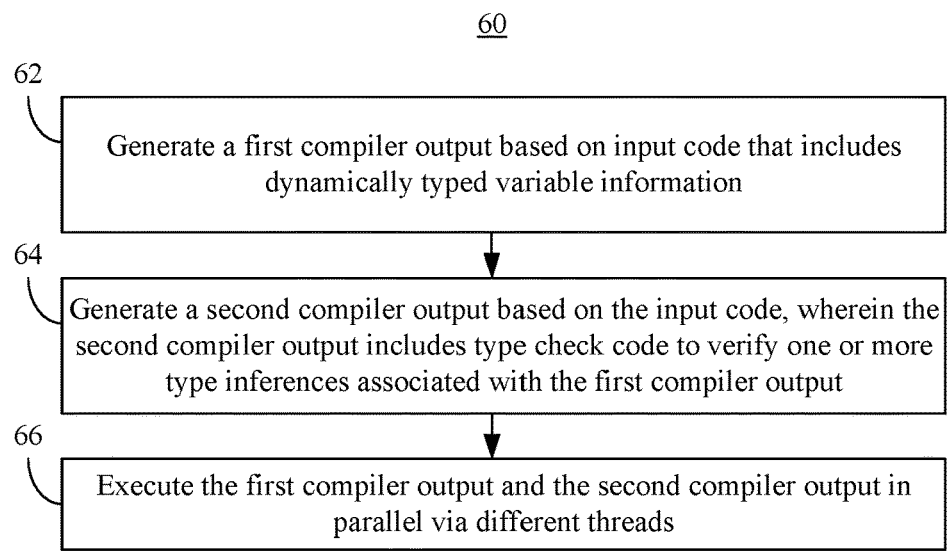
FIG. 3 is a flowchart of an example of a method of operating a compiler apparatus according to an embodiment.

FIG. 3 shows a method 60 of operating a compiler apparatus. The method 60 may generally be implemented in an execution architecture such as, for example, the enhanced execution architecture 30 (FIG. 1). More particularly, the method 60 may be implemented as one or more modules in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 60 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 62 provides for generating a first compiler output based on input code that includes dynamically typed variable information. In an embodiment, the input code is written in a language such as, for example, JAVASCRIPT, PYTHON, RUBY, etc., wherein variable type information is not known at compile time. Thus, block 62 may include drawing one or more type inference(s) and optimizing the first compiler output based on the type inference(s). For example, block 62 might include inferring that a portion of the input code involves an integer addition operation and creating a code path in the first compiler output that is tailored/optimized to integer addition operations. A second compiler output is generated at illustrated block 64, wherein the second compiler output includes type check code to verify the type inference(s) associated with the first compiler output.

Additionally, block 66 executes (e.g., at runtime) the first compiler output and the second compiler output in parallel via different threads. Thus, block 66 might include executing the first compiler output in a first thread running on a first processor core and executing the second compiler output in a second thread running on a second processor core. As already noted, the threads may be dispatched to appropriate hardware computation units via, for example, the ONEAPI dynamic dispatch and interface to the executing processor. Block 66 may also include synchronizing, via one or more shared memory objects (e.g., in a shared memory address), communications between the first compiler output and the second compiler output. Additionally, the first compiler output may include transactional execution code to immediately abort one or more tasks of the first compiler output if a verification of the type inference(s) fails, spinlock code to place the first compiler output in a wait state until verification of the type inference(s) is confirmed by the second compiler output, and memory code to store one or more results of the transactional execution code to the memory. In an embodiment, the first compiler output further includes fallback code to transition the compiler apparatus into an execution state that is independent of the type inference(s) if the verification of the type inference(s) fails.

The illustrated method 60 therefore enables enhanced performance to be achieved by executing the first compiler output and the second compiler output in parallel via different threads. More particularly, the intended code is not forced to wait until operation of the type check code (e.g., which might be relatively "branchy") is complete. Rather, the intended code speculatively executes in a separate thread while the type check code is executing. Indeed, the enhanced performance may translate into better responsiveness and/or smoothness of applications and an improved user experience. Moreover, systems having relatively small I-caches may achieve locality and performance levels that are on par with systems having relatively large I-cache sizes due to the isolation of the type check code in a separate thread. Additionally, the use of transactional execution code (e.g., when the intended code is dispatched to a CPU core) may further enhance performance by enabling the tasks of the intended code to be immediately aborted when a type check failure is detected.

Figure 4:
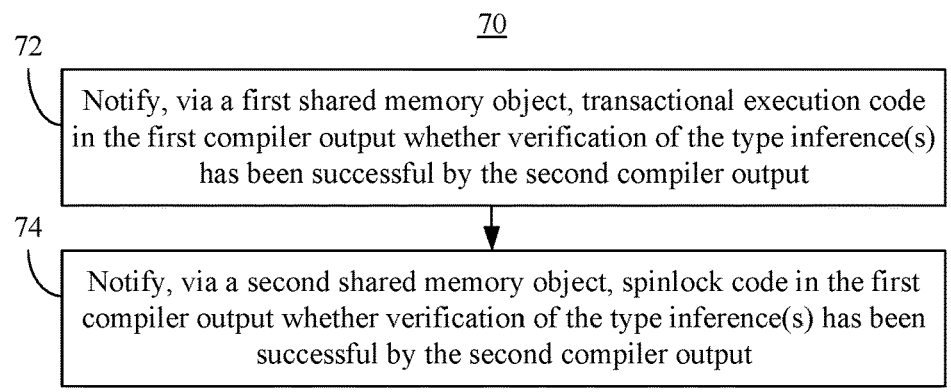
FIG. 4 is a flowchart of an example of a method of synchronizing communications between a first compiler output and a second compiler output according to an embodiment.

FIG. 4 shows a method 70 of synchronizing communications between a first compiler output and a second compiler output. The method 70 may generally be incorporated into block 66 (FIG. 3), already discussed. More particularly, the method 70 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 72 provides for notifying, via a first shared memory object (e.g., in a shared memory address), transactional execution code in the first compiler whether verification of the type inference(s) has been successful by the second compiler output. Block 74 notifies, via a second shared memory object, spinlock code in the first compiler output whether verification of the type inference(s) has been successful by the second compiler output. As already noted, the spinlock code may place the first compiler code in a wait state until verification of the type inference(s) is confirmed by the second compiler output. The illustrated method 70 therefore further enhances performance by making communications between the first and second compiler outputs more efficient.

Figure 5:
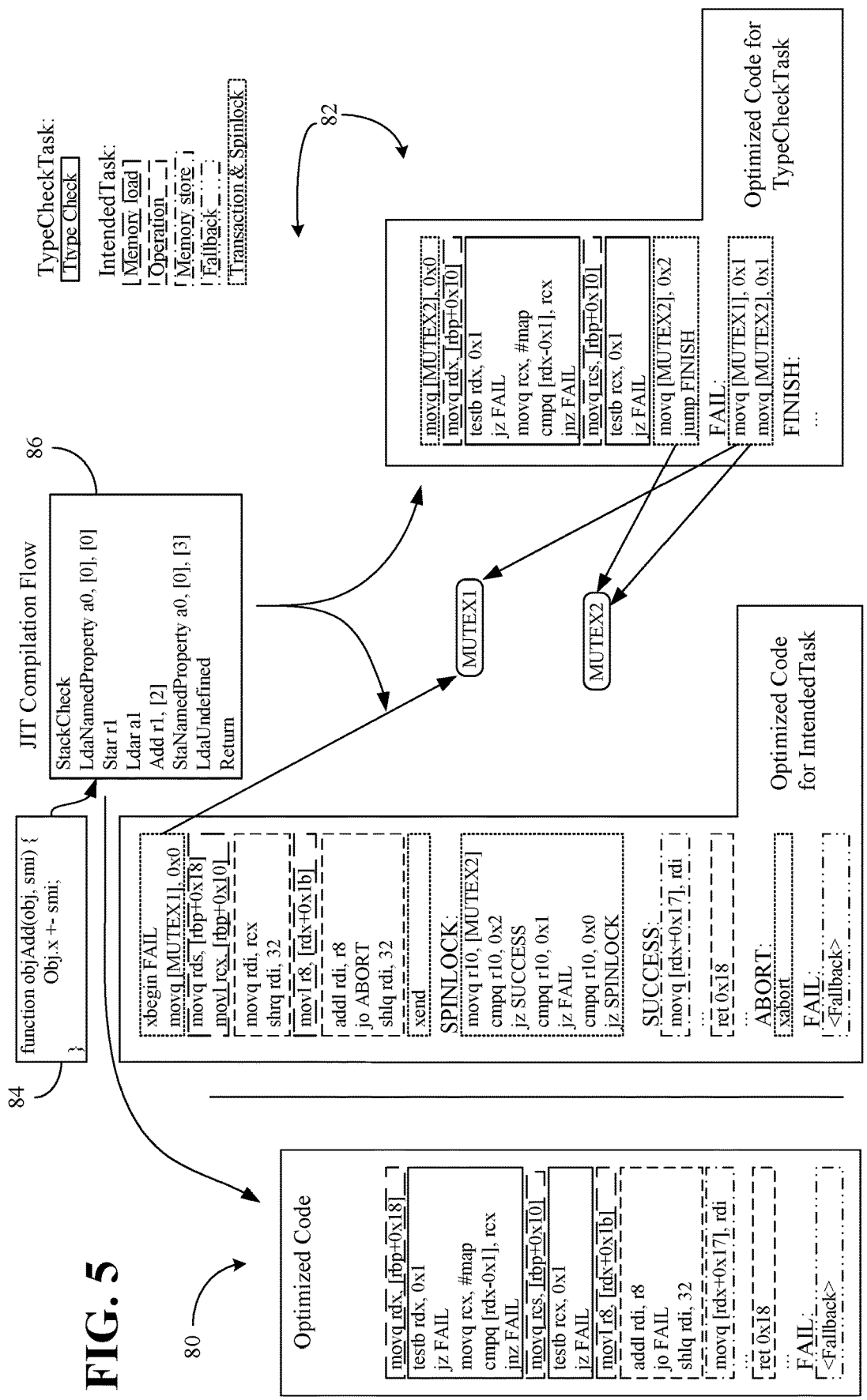
FIG. 5 is a comparative illustration of an example of a conventional compiler output and a compiler output according to an embodiment.

FIG. 5 shows a conventional compiler output 80 and an enhanced compiler output 82 from a JIT compilation flow 86 that optimizes (e.g., based on type inferences/speculation) input code 84 written in a dynamically typed programming language. In the illustrated example, a first shared memory object (MUTEX1) is used to notify transactional execution code in an "Intended" task (e.g., first compiler output) whether verification of the type inferences by a "Type-Check" task (e.g., second compiler output) has been successful. Additionally, a second shared memory object (MUTEX2) may be used to notify spinlock code in the Intended task whether verification of the type inference(s) has been successful by the TypeCheck task. In the illustrated example, the TypeCheck task updates the MUTEX1 object only in response to a failure of the type check and updates the MUTEX2 object in response to a failure or a successful completion of the type check.

Figure 6:
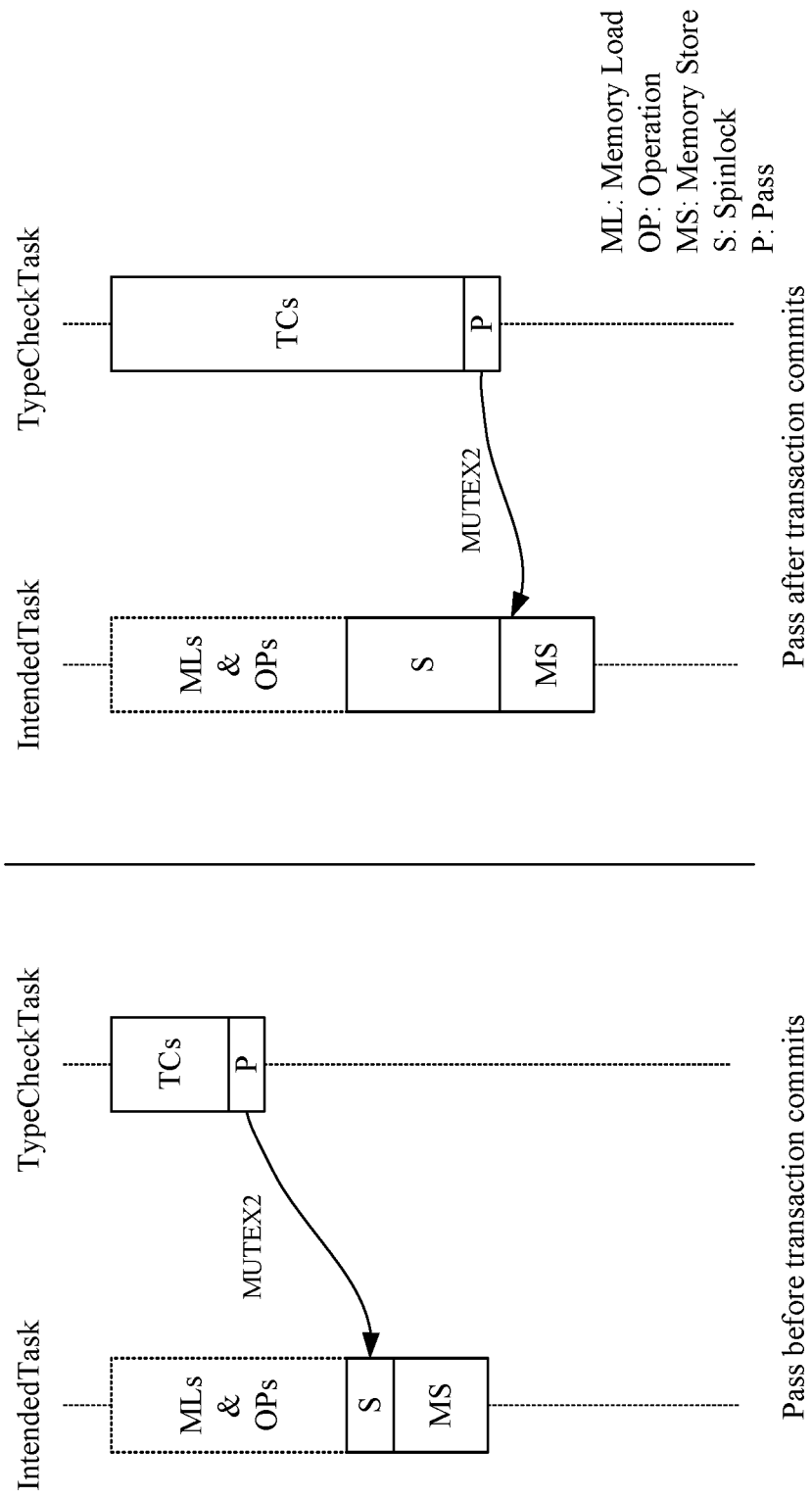
FIG. 6 is an illustration of an example of an execution flow when type checks pass according to an embodiment.

FIG. 6 shows an execution flow 90 that might occur when a type check passes (e.g., successfully completes). If all type checks pass, the TypeCheck task will only update MUTEX2 object. Intended operations are transactionally executed and committed successfully. Moreover, because type checks are usually faster than intended operations, the spinlock code is usually bypassed with little overhead (e.g., the "Pass before transaction commits" example). If type checks are slower than the intended operations, the spinlock code will maintain the Intended Task in a wait state (e.g., causing the spinlock "S" execution to be longer) until all type checks to finish and obtain the result from the TypeCheck task via the MUTEX2 object (e.g., the "Pass after transaction commits" example). The memory store is only executed after the spinlock code, in the illustrated example.

Figure 7:
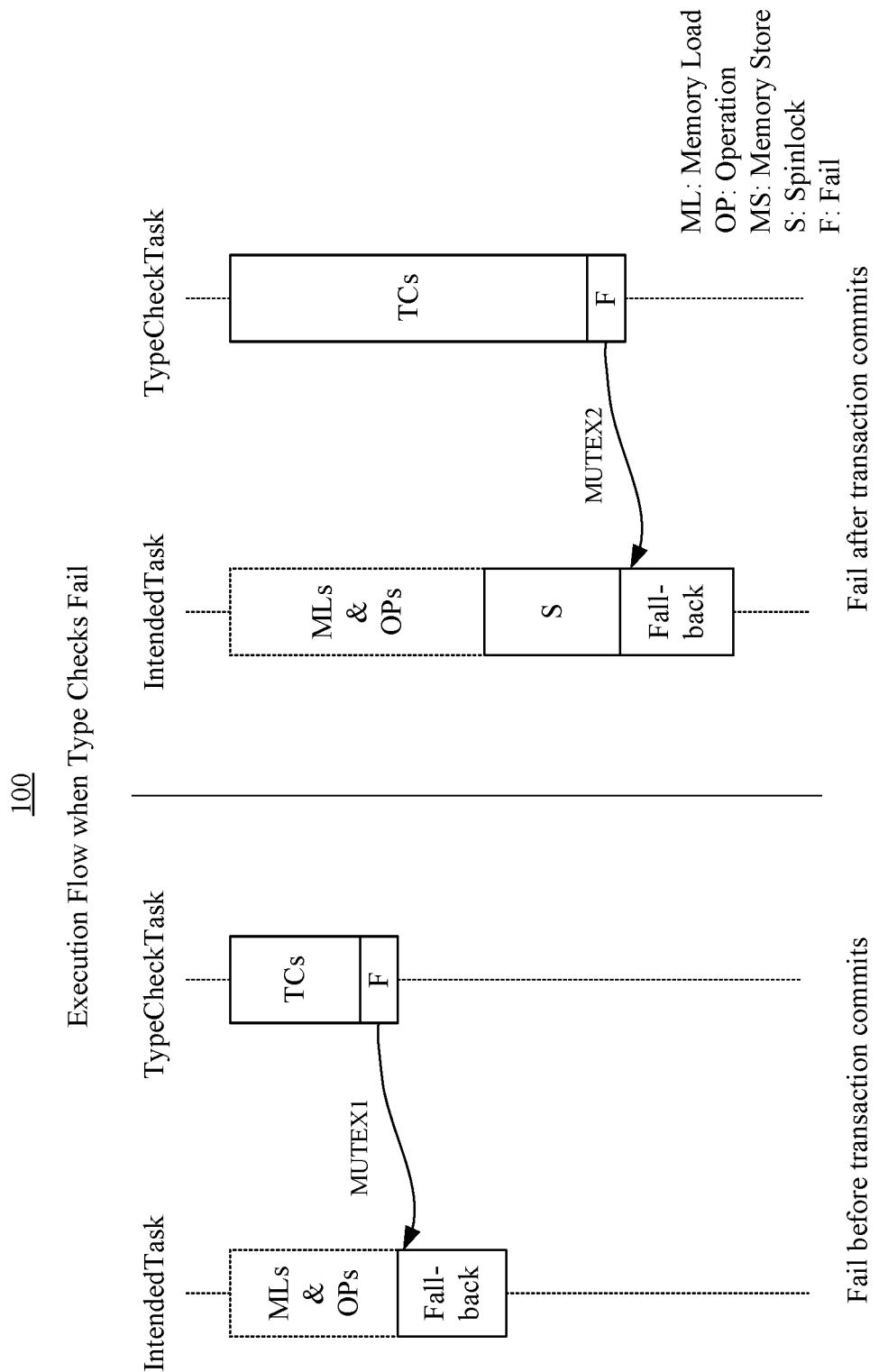
FIG. 7 is an illustration of an example of an execution flow when type checks fail according to an embodiment.

FIG. 7 shows an execution flow 100 that might occur when a type check fails. If a type check fails, the illustrated TypeCheck task will update both the MUTEX1 object and the MUTEX2 object. If the update occurs before the transaction commits in the Intended task (e.g., the "Fail before transaction commits" example), the failure causes the transaction to rollback and abort immediately. Additionally, if the type check failure occurs later than the transaction (e.g., the "Fail after transaction commits" example), the transaction will commit but the spinlock code will maintain the Intended task in a wait state until the type check result is received. The fallback code will execute after the Intended task obtains the type check failure result via the MUTEX2 object.

Figure 8:
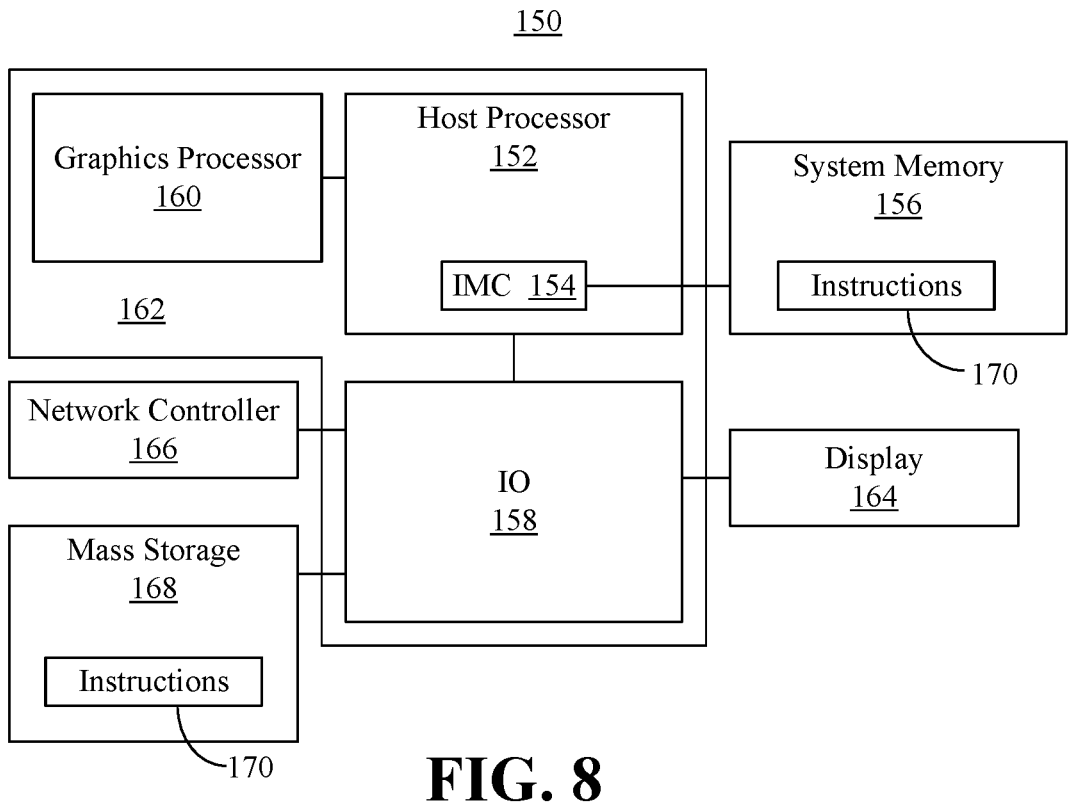
FIG. 8 is a block diagram of an example of a performance-enhanced computing system according to an embodiment.

Turning now to FIG. 8, a performance-enhanced computing system 150 is shown. The system 150 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), etc., or any combination thereof. In the illustrated example, the system 150 includes a host processor 152 (e.g., central processing unit/CPU) having an integrated memory controller (IMC) 154 that is coupled to a system memory 156. In an embodiment, at least a portion of the system memory 156 is operated as a hardware restricted transactional memory (RTM).

The illustrated system 150 also includes an input output (TO) module 158 implemented together with the host processor 152 and a graphics processor 160 on a semiconductor die 162 as a system on chip (SoC). The illustrated IO module 158 communicates with, for example, a display 164 (e.g., touch screen, liquid crystal display/LCD, light emitting diode/LED display), a network controller 166 (e.g., wired and/or wireless NIC), and mass storage 168 (e.g., hard disk drive/HDD, optical disk, solid state drive/SSD, flash memory). In an embodiment, the network controller 166 obtains input code that includes dynamically typed variable information.

In an embodiment, the host processor 152, the graphics processor 160 and/or the TO module 158 execute program instructions 170 retrieved from the system memory 156 and/or the mass storage 168 to perform one or more aspects of the method 60 (FIG. 3) and/or the method 70 (FIG. 4), already discussed. Thus, execution of the illustrated instructions 170 may cause the computing system 150 to generate a first compiler output based on the input code and generate a second compiler output based on the input code, wherein the second compiler output is to include type check code to verify one or more type inferences associated with the first compiler output. The semiconductor die 62 may therefore operate as a compiler apparatus (e.g., JIT compiler engine that compiles at runtime).

Additionally, execution of the program instructions 170 may cause the computing system 150 to execute (e.g., at runtime) the first compiler output and the second compiler output in parallel via different threads. In an example, the semiconductor die 162 includes the enhanced execution architecture 30 (FIG. 1), already discussed. Thus, to execute the first and second compiler outputs in parallel, the program instructions 170 might execute the first compiler output in a first thread running on a first processor core of the semiconductor die 162 and execute the second compiler output in a second thread running on a second processor core of the semiconductor die 162.

In one example, the first compiler output includes transactional execution code to abort one or more tasks of the first compiler output if a verification of the one or more type inferences fails, spinlock code to place the first compiler output in a wait state until verification of the one or more type inferences is confirmed by the second compiler output, and memory store code to store one or more results of the transactional execution code to the system memory 156 and/or the mass storage 168. The transactional execution code may also include fallback code to transition the computing system 150 into an execution state that is independent of the type inference(s) if the verification of the type inference(s) fails.

Moreover, execution of the program instructions 170 may cause the computing system 150 to synchronize, via one or more shared memory objects, communications between the first compiler output and the second compiler output. In such a case, the program instructions 170 might notify, via a first shared memory object, transactional execution code in the first compiler output whether verification of the type inference(s) has been successful by the second compiler output. Additionally, the program instructions 170 may notify, via a second shared memory object, spinlock code in the first compiler output whether verification of the type inference(s) has been successful by the second compiler output.

As already noted, the first compiler output (e.g., containing the IntendedTask) and the second compiler output (e.g., containing the TypeCheckTask) may be dispatched in different hardware computation units via ONEAPI according to a profiled computation type of tasks. For example, the second compiler output may be dedicated to a small core (not shown) of the host processor 152 if the TypeCheckTask is known to be short and contain no computation work. Moreover, the first compiler output (e.g. to which the IntendedTask is dedicated), might be dispatched to 1) a relatively large core (not shown) of the host processor 152 if the IntendedTask contains heavy scalar computation, 2) the graphics processor 160 if the IntendedTask contains heavy vector computation, 3) an AI accelerator (not shown, e.g., INTEL MOVIDIUS) if the IntendedTask contains heavy matrix computation, or 4) an FPGA (not shown) if the IntendedTask contains heavy spatial computation. Through the task separation conducted by the compiler and the dynamic dispatch of a unified programming model such as ONEAPI, all available hardware resources are used to full advantage, which boosts both power savings and performance.

The illustrated computing system 150 is therefore considered to be performance-enhanced at least to the extent that it executes the first compiler output and the second compiler output in parallel via different threads. More particularly, the intended code is not forced to wait until operation of the type check code (e.g., which might be relatively branchy) is complete. Rather, the intended code speculatively executes in a separate thread while the type check code is executing. Indeed, the enhanced performance may translate into better responsiveness and/or smoothness of applications and an improved user experience. Moreover, if the computing system 150 has relatively small I-caches, execution of the program instructions 170 may achieve locality and performance levels that are on par with systems having relatively large I-cache sizes due to the isolation of the type check code in a separate thread. Additionally, the use of transactional execution code may further enhance performance by enabling the tasks of the intended code to be immediately aborted when a type check failure is detected.

Figure 9:
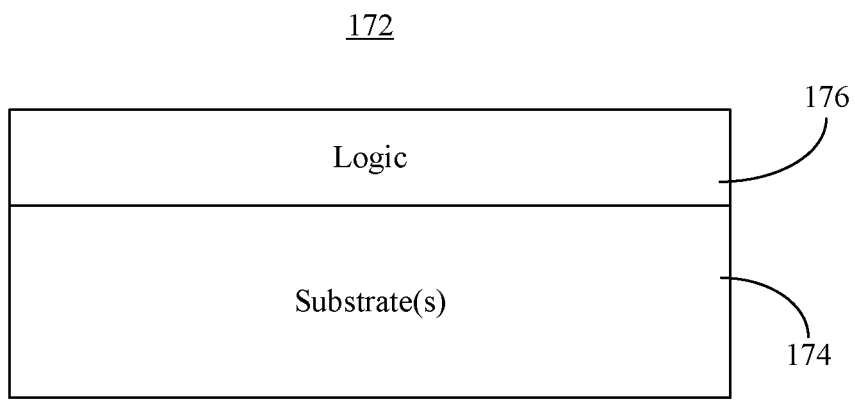
FIG. 9 is an illustration of an example of a semiconductor apparatus according to an embodiment.

FIG. 9 shows a semiconductor apparatus 172 (e.g., chip, die, package). The illustrated apparatus 172 includes one or more substrates 174 (e.g., silicon, sapphire, gallium arsenide) and logic 176 (e.g., transistor array and other integrated circuit/IC components) coupled to the substrate(s) 174. In an embodiment, the logic 176 implements one or more aspects of method 60 (FIG. 3) and/or the method 70 (FIG. 4), already discussed. Thus, the logic 176 may generate a first compiler output based on the input code and generate a second compiler output based on the input code, wherein the second compiler output is to include type check code to verify one or more type inferences associated with the first compiler output. The semiconductor apparatus 172 may therefore operate as a compiler apparatus (e.g., JIT compiler engine).

The logic 176 may be implemented at least partly in configurable logic or fixed-functionality hardware logic. In one example, the logic 176 includes transistor channel regions that are positioned (e.g., embedded) within the substrate(s) 174. Thus, the interface between the logic 176 and the substrate(s) 174 may not be an abrupt junction. The logic 176 may also be considered to include an epitaxial layer that is grown on an initial wafer of the substrate(s) 174.

The illustrated semiconductor apparatus 172 is therefore considered to be performance-enhanced because it executes the first compiler output and the second compiler output in parallel via different threads. More particularly, the intended code is not forced to wait until operation of the type check code (e.g., which might be relatively branchy) is complete. Rather, the intended code speculatively executes in a separate thread while the type check code is executing. Indeed, the enhanced performance may translate into better responsiveness and/or smoothness of applications and an improved user experience. Moreover, if the semiconductor apparatus 172 has relatively small I-caches, the logic 176 may achieve locality and performance levels that are on par with systems having relatively large I-cache sizes due to the isolation of the type check code in a separate thread. Additionally, the use of transactional execution code may further enhance performance by enabling the tasks of the intended code to be immediately aborted when a type check failure is detected.

Figure 10:
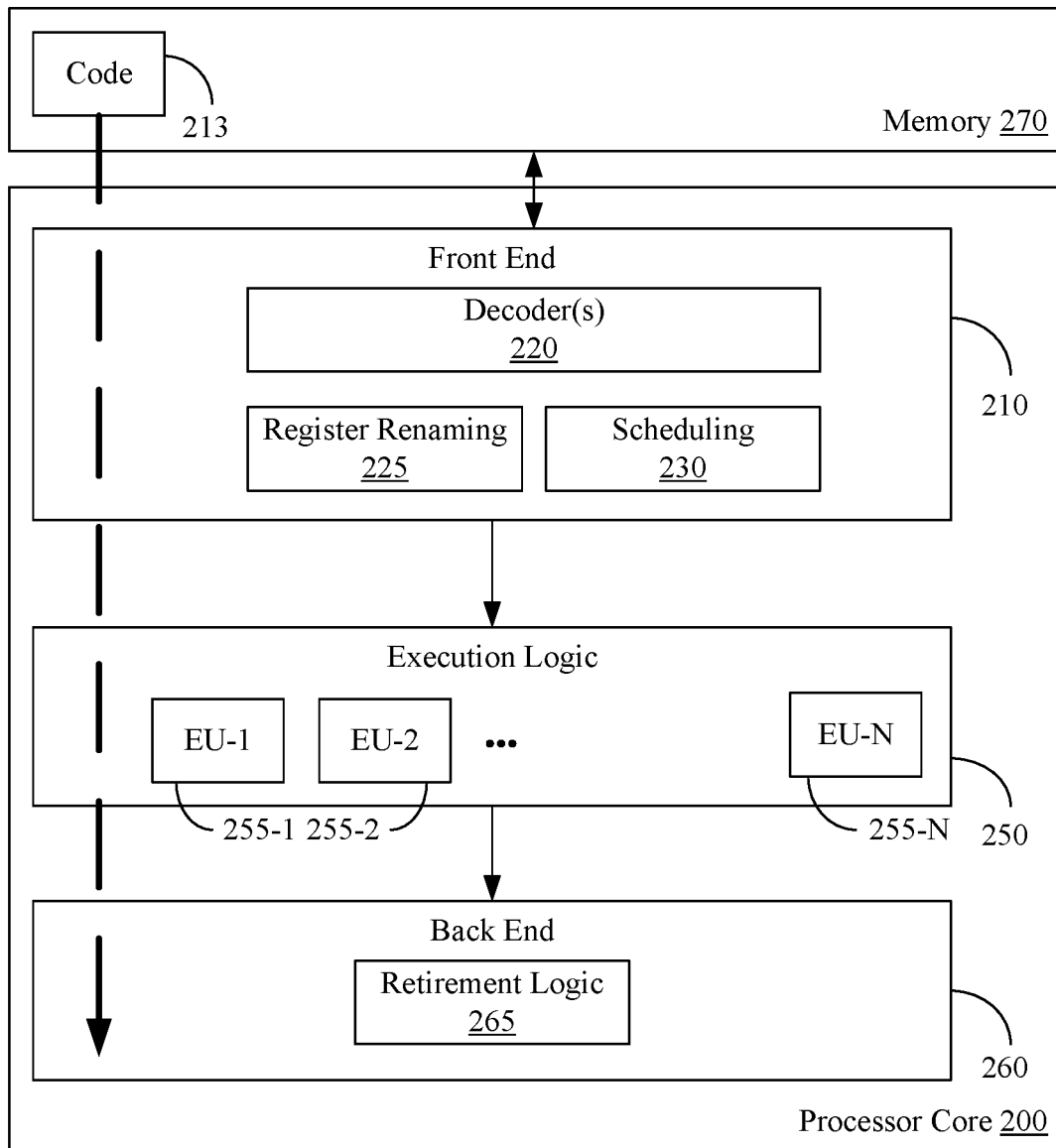
FIG. 10 is a block diagram of an example of a processor according to an embodiment.

FIG. 10 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 10, a processing element may alternatively include more than one of the processor core 200 illustrated in FIG. 10. The processor core 200 may be a single-threaded core or, for at least one embodiment, the processor core 200 may be multithreaded in that it may include more than one hardware thread context (or "logical processor") per core.

FIG. 10 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement method 60 (FIG. 3) and/or the method 70 (FIG. 4), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 10, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 11, shown is a block diagram of a computing system 1000 embodiment in accordance with an embodiment. Shown in FIG. 11 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 11 may be implemented as a multi-drop bus rather than point-to-point interconnect.

As shown in FIG. 11, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 10.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 11, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 11, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 11, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 60 (FIG. 3) and/or the method 70 (FIG. 4), already discussed, and may be similar to the code 213 (FIG. 10), already discussed. Further, an audio I/O 1024 may be coupled to second bus 1020 and a battery 1010 may supply power to the computing system 1000.

Note that other embodiments are contemplated. For example, instead of the point-to-point architecture of FIG. 11, a system may implement a multi-drop bus or another such communication topology. Also, the elements of FIG. 11 may alternatively be partitioned using more or fewer integrated chips than shown in FIG. 11.

Additional Notes and Examples

Example 1 includes a performance-enhanced computing system comprising a network controller to obtain input code that includes dynamically typed variable information, a processor coupled to the network controller, and a memory coupled to the processor, the memory including a set of instructions, which when executed by the processor, cause the computing system to generate a first compiler output based on the input code, generate a second compiler output based on the input code, wherein the second compiler output is to include type check code to verify one or more type inferences associated with the first compiler output, and execute the first compiler output and the second compiler output in parallel via different threads.

Example 2 includes the computing system of Example 1, wherein the instructions, when executed, further cause the computing system to synchronize, via one or more shared memory objects, communications between the first compiler output and the second compiler output.

Example 3 includes the computing system of Example 2, wherein to synchronize the communications, the instructions, when executed, cause the computing system to notify, via a first shared memory object, transactional execution code in the first compiler output whether verification of the one or more type inferences has been successful by the second compiler output, and notify, via a second shared memory object, spinlock code in the first compiler output whether verification of the one or more type inferences has been successful by the second compiler output.

Example 4 includes the computing system of Example 1, wherein the first compiler output is to include transactional execution code to abort one or more tasks of the first compiler output if a verification of the one or more type inferences fails, spinlock code to place the first compiler output in a wait state until verification of the one or more type inferences is confirmed by the second compiler output, and memory store code to store one or more results of the transactional execution code to the memory.

Example 5 includes the computing system of Example 4, wherein the first compiler output is to further include fallback code to transition the computing system into an execution state that is independent of the one or more type inferences if the verification of the one or more type inferences fails.

Example 6 includes the computing system of any one of Examples 1 to 5, further including a first processor core and a second processor core, wherein to execute the first compiler output and the second compiler output in parallel, the instructions, when executed, cause the computing system to execute the first compiler output in a first thread running on the first processor core, and execute the second compiler output in a second thread running on the second processor core.

Example 7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to generate a first compiler output based on input code that includes dynamically typed variable information, generate a second compiler output based on the input code, wherein the second compiler output is to include type check code to verify one or more type inferences associated with the first compiler output, and execute the first compiler output and the second compiler output in parallel via different threads.

Example 8 includes the semiconductor apparatus of Example 7, wherein the logic coupled to the one or more substrates is to synchronize, via one or more shared memory objects, communications between the first compiler output and the second compiler output.

Example 9 includes the semiconductor apparatus of Example 8, wherein the logic coupled to the one or more substrates is to notify, via a first shared memory object, transactional execution code in the first compiler output whether verification of the one or more type inferences has been successful by the second compiler output, and notify, via a second shared memory object, spinlock code in the first compiler output whether verification of the one or more type inferences has been successful by the second compiler output.

Example 10 includes the semiconductor apparatus of Example 7, wherein the first compiler output is to include transactional execution code to abort one or more tasks of the first compiler output if a verification of the one or more type inferences fails, spinlock code to place the first compiler output in a wait state until verification of the one or more type inferences is confirmed by the second compiler output, and memory store code to store one or more results of the transactional execution code to the memory.

Example 11 includes the semiconductor apparatus of Example 10, wherein the first compiler output is to further include fallback code to transition the computing system into an execution state that is independent of the one or more type inferences if the verification of the one or more type inferences fails.

Example 12 includes the semiconductor apparatus of any one of Examples 7 to 11, wherein the logic coupled to the one or more substrates is to execute the first compiler output in a first thread running on a first processor core, and execute the second compiler output in a second thread running on a second processor core.

Example 13 includes at least one computer readable storage medium comprising a set of instructions, which when executed by a computing system, cause the computing system to generate a first compiler output based on input code that includes dynamically typed variable information, generate a second compiler output based on the input code, wherein the second compiler output is to include type check code to verify one or more type inferences associated with the first compiler output, and execute the first compiler output and the second compiler output in parallel via different threads.

Example 14 includes the at least one computer readable storage medium of Example 13, wherein the instructions, when executed, further cause the computing system to synchronize, via one or more shared memory objects, communications between the first compiler output and the second compiler output.

Example 15 includes the at least one computer readable storage medium of Example 14, wherein to synchronize the communications, the instructions, when executed, cause the computing system to notify, via a first shared memory object, transactional execution code in the first compiler output whether verification of the one or more type inferences has been successful by the second compiler output, and notify, via a second shared memory object, spinlock code in the first compiler output whether verification of the one or more type inferences has been successful by the second compiler output.

Example 16 includes the at least one computer readable storage medium of Example 13, wherein the first compiler output is to include transactional execution code to abort one or more tasks of the first compiler output if a verification of the one or more type inferences fails, spinlock code to place the first compiler output in a wait state until verification of the one or more type inferences is confirmed by the second compiler output, and memory store code to store one or more results of the transactional execution code to the memory.

Example 17 includes the at least one computer readable storage medium of Example 16, wherein the first compiler output is to further include fallback code to transition the computing system into an execution state that is independent of the one or more type inferences if the verification of the one or more type inferences fails.

Example 18 includes the at least one computer readable storage medium of any one of Examples 13 to 17, wherein to execute the first compiler output and the second compiler output in parallel, the instructions, when executed, cause the computing system to execute the first compiler output in a first thread running on a first processor core, and execute the second compiler output in a second thread running on a second processor core.

Example 19 includes a method of operating a just-in-time (JIT) compiler apparatus comprising generating a first compiler output based on input code that includes dynamically typed variable information, generating a second compiler output based on the input code, wherein the second compiler output includes type check code to verify one or more type inferences associated with the first compiler output, and executing the first compiler output and the second compiler output in parallel via different threads.

Example 20 includes the method of Example 19, further comprising synchronizing, via one or more shared memory objects, communications between the first compiler output and the second compiler output.

Example 21 includes the method of Example 20, wherein synchronizing the communications includes notifying, via a first shared memory object, transactional execution code in the first compiler output whether verification of the one or more type inferences has been successful by the second compiler output, and notifying, via a second shared memory object, spinlock code in the first compiler output whether verification of the one or more type inferences by the second compiler output has been successful by the second compiler output.

Example 22 includes the method of Example 19, wherein the first compiler output includes transactional execution code to abort one or more tasks of the first compiler output if a verification of the one or more type inferences fails, spinlock code to place the first compiler output in a wait state until verification of the one or more type inferences is confirmed by the second compiler output, and memory store code to store one or more results of the transactional execution code to the memory.

Example 23 includes the method of Example 22, wherein the first compiler output further includes fallback code to transition the compiler apparatus into an execution state that is independent of the one or more type inferences if the verification of the one or more type inferences fails.

Example 24 includes the method of any one of Examples 19 to 23, wherein executing the first compiler output and the second compiler output in parallel includes executing the first compiler output in a first thread running on a first processor core, and executing the second compiler output in a second thread running on a second processor core.

Thus, technology described herein improves the performance of JAVASCRIPT and other dynamic typed languages on multi-core platforms with transactional memory. The technology also enlarges the performance advantages over or close performance gaps between systems that have larger I-Cache sizes, because moving the branchy type checks into a separate task will largely reduce the I-Cache pressure of the intended task (e.g., benefitting the performance of platforms with small I-Cache sizes). Moreover, the technology may improve the user experience with respect to responsiveness, smoothness of web applications and NODEJS based applications, and so forth.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
   a network controller to obtain input code that includes dynamically typed variable information;
   a processor coupled to the network controller; and
   a memory coupled to the processor, the memory including a set of instructions, which when executed by the processor, cause the computing system to:
   generate a first compiler output based on the input code,
   generate a second compiler output based on the input code, wherein the second compiler output is to include type check code to verify one or more type inferences associated with the first compiler output, and
   execute the first compiler output and the second compiler output in parallel via different threads,
   wherein the first compiler output is to further include fallback code to transition the computing system into an execution state that is independent of the one or more type inferences if a verification of the one or more type inferences by the second compiler output fails.

2. The computing system of claim 1, wherein the set of instructions, which when executed by the processor, further cause the computing system to synchronize, via one or more shared memory objects, communications between the first compiler output and the second compiler output.

3. The computing system of claim 2, wherein to synchronize the communications between the first compiler output and the second compiler output, the set of instructions, which when executed by the processor, further cause the computing system to:
   notify, via a first shared memory object, transactional execution code in the first compiler output whether the verification of the one or more type inferences has been successful by the second compiler output; and
   notify, via a second shared memory object, spinlock code in the first compiler output whether the verification of the one or more type inferences has been successful by the second compiler output.

4. The computing system of claim 1, wherein the first compiler output is to include transactional execution code to abort one or more tasks of the first compiler output if the verification of the one or more type inferences by the second compiler output fails, spinlock code to place the first compiler output in a wait state until the verification of the one or more type inferences is confirmed by the second compiler output, and memory store code to store one or more results of the transactional execution code to the memory.

5. The computing system of claim 1, further including a first processor core and a second processor core, wherein to execute the first compiler output and the second compiler output in parallel via the different threads, the set of instructions, which when executed by the processor, further cause the computing system to:
   execute the first compiler output in a first thread running on the first processor core; and
   execute the second compiler output in a second thread running on the second processor core.

6. A semiconductor apparatus comprising:
   one or more substrates; and
   logic coupled to the one or more substrates, wherein the logic is implemented at least partly in one or more of configurable logic or fixed-functionality hardware logic, the logic coupled to the one or more substrates to:
   generate a first compiler output based on input code that includes dynamically typed variable information,
   generate a second compiler output based on the input code, wherein the second compiler output is to include type check code to verify one or more type inferences associated with the first compiler output, and
   execute the first compiler output and the second compiler output in parallel via different threads,
   wherein the first compiler output is to further include fallback code to transition a computing system into an execution state that is independent of the one or more type inferences if a verification of the one or more type inferences by the second compiler output fails.

7. The semiconductor apparatus of claim 6, wherein the logic coupled to the one or more substrates is to further synchronize, via one or more shared memory objects, communications between the first compiler output and the second compiler output.

8. The semiconductor apparatus of claim 7, wherein the logic coupled to the one or more substrates is to further:
   notify, via a first shared memory object, transactional execution code in the first compiler output whether the verification of the one or more type inferences has been successful by the second compiler output; and
   notify, via a second shared memory object, spinlock code in the first compiler output whether the verification of the one or more type inferences has been successful by the second compiler output.

9. The semiconductor apparatus of claim 6, wherein the first compiler output is to include transactional execution code to abort one or more tasks of the first compiler output if the verification of the one or more type inferences by the second compiler output fails, spinlock code to place the first compiler output in a wait state until the verification of the one or more type inferences is confirmed by the second compiler output, and memory store code to store one or more results of the transactional execution code to a memory.

10. The semiconductor apparatus of claim 6, wherein the logic coupled to the one or more substrates is to further:
execute the first compiler output in a first thread running on a first processor core; and
execute the second compiler output in a second thread running on a second processor core.

11. At least one non-transitory computer-readable storage medium storing a set of instructions, which when executed by a computing system, cause the computing system to:
generate a first compiler output based on input code that includes dynamically typed variable information;
generate a second compiler output based on the input code, wherein the second compiler output is to include type check code to verify one or more type inferences associated with the first compiler output, and
execute the first compiler output and the second compiler output in parallel via different threads,
wherein the first compiler output is to further include fallback code to transition the computing system into an execution state that is independent of the one or more type inferences if a verification of the one or more type inferences by the second compiler output fails.

12. The at least one non-transitory computer-readable storage medium of claim 11, wherein the set of instructions, which when executed by the computing system, further cause the computing system to synchronize, via one or more shared memory objects, communications between the first compiler output and the second compiler output.

13. The at least one non-transitory computer-readable storage medium of claim 12, wherein to synchronize the communications between the first compiler output and the second compiler output, the set of instructions, which when executed by the computing system, further cause the computing system to:
notify, via a first shared memory object, transactional execution code in the first compiler output whether the verification of the one or more type inferences has been successful by the second compiler output; and
notify, via a second shared memory object, spinlock code in the first compiler output whether the verification of the one or more type inferences has been successful by the second compiler output.

14. The at least one non-transitory computer-readable storage medium of claim 11, wherein the first compiler output is to include transactional execution code to abort one or more tasks of the first compiler output if the verification of the one or more type inferences by the second compiler output fails by the second compiler output, spinlock code to place the first compiler output in a wait state until the verification of the one or more type inferences by the second compiler output is confirmed by the second compiler output, and memory store code to store one or more results of the transactional execution code to the memory.

15. The at least one non-transitory computer-readable storage medium of claim 11, wherein to execute the first compiler output and the second compiler output in parallel via the different threads, the set of instructions, which when executed by the computing system, further cause the computing system to:
execute the first compiler output in a first thread running on a first processor core; and
execute the second compiler output in a second thread running on a second processor core.

16. A method of operating a just-in-time (JIT) compiler apparatus comprising:
generating a first compiler output based on input code that includes dynamically typed variable information;
generating a second compiler output based on the input code, wherein the second compiler output includes type check code to verify one or more type inferences associated with the first compiler output; and
executing the first compiler output and the second compiler output in parallel via different threads,
wherein the first compiler output is to further include fallback code to transition the JIT compiler apparatus into an execution state that is independent of the one or more type inferences if a verification of the one or more type inferences by the second compiler output fails.

17. The method of claim 16, further comprising synchronizing, via one or more shared memory objects, communications between the first compiler output and the second compiler output.

18. The method of claim 17, wherein synchronizing the communications between the first compiler output and the second compiler output further includes:
notifying, via a first shared memory object, transactional execution code in the first compiler output whether the verification of the one or more type inferences has been successful by the second compiler output; and
notifying, via a second shared memory object, spinlock code in the first compiler output whether the verification of the one or more type inferences has been successful by the second compiler output.

19. The method of claim 16, wherein the first compiler output includes transactional execution code to abort one or more tasks of the first compiler output if the verification of the one or more type inferences by the second compiler output fails, spinlock code to place the first compiler output in a wait state until the verification of the one or more type inferences is confirmed by the second compiler output, and memory store code to store one or more results of the transactional execution code to the memory.

20. The method of claim 16, wherein executing the first compiler output and the second compiler output in parallel via the different threads further includes:
executing the first compiler output in a first thread running on a first processor core; and
executing the second compiler output in a second thread running on a second processor core.

* * * * *